United States Patent

Kadakia et al.

[11] Patent Number: 5,365,601
[45] Date of Patent: Nov. 15, 1994

[54] N-BIT WIDE PARALLEL ROTATION ALGORITHM

[75] Inventors: Vinod K. Kadakia, Rancho Palos Verdes; Jeffrey N. Kellman, Hawthorne; Christine Kang, Los Angeles, all of Calif.

[73] Assignee: Xerox Corporation, Stamford, Conn.

[21] Appl. No.: 811,865

[22] Filed: Dec. 23, 1991

[51] Int. Cl.⁵ ............................................. G06K 9/32
[52] U.S. Cl. ..................................... 382/46; 395/137; 345/126
[58] Field of Search ................... 382/44, 46; 395/137, 395/400; 340/727; 358/448

[56] References Cited

U.S. PATENT DOCUMENTS

| | | | |
|---|---|---|---|
| 4,271,476 | 6/1981 | Lotspiech | 340/727 |
| 4,636,783 | 1/1987 | Omachi | 340/727 |
| 4,703,515 | 10/1987 | Baroody, Jr. | 382/46 |
| 4,776,026 | 10/1988 | Ueyama | 382/46 |
| 4,797,852 | 1/1989 | Nanda | 382/46 |
| 4,806,920 | 2/1989 | Sawada | 340/727 |
| 4,837,845 | 6/1989 | Pruett et al. | 382/46 |
| 5,068,904 | 11/1991 | Yamazaki | 382/46 |
| 5,111,192 | 5/1992 | Kadakia | 340/727 |
| 5,124,692 | 6/1992 | Sasson | 340/727 |

FOREIGN PATENT DOCUMENTS 0188678  7/1986  European Pat. Off. ............. 382/46

Primary Examiner—Leo H. Boudreau
Assistant Examiner—Chris Kelley
Attorney, Agent, or Firm—Robert Cunha

[57] ABSTRACT

A circuit for rapidly rotating a digital image through 90 or 270 degrees utilizing memory implemented from ordinary 4-bit wide memory devices. This pipelined circuit transfers the image through a page buffer and a band buffer in a series of memory accessing, shining and reordering steps which converts all vertical lines to horizontal lines and all horizontal lines to vertical lines without requiring the use of a parallel to serial conversion.

2 Claims, 6 Drawing Sheets

| 7C,7D,7E,7F L1 | 7C,7D,7E,7F L2 | 7C,7D,7E,7F L3 | 7C,7D,7E,7F L4 |
| --- | --- | --- | --- |
| 78,79,7A,7B L2 | 78,79,7A,7B L3 | 78,79,7A,7B L0 | 78,79,7A,7B L1 |
| 74,75,76,77 L3 | 74,75,76,77 L0 | 74,75,76,77 L1 | 74,75,76,77 L2 |
| 70,71,72,73 L0 | 70,71,72,73 L1 | 70,71,72,73 L2 | 70,71,72,73 L3 |
| 6C,6D,6E,6F L1 | 6C,6D,6E,6F L2 | 6C,6D,6E,6F L3 | 6C,6D,6E,6F L0 |
| ⋮ | ⋮ | ⋮ | ⋮ |
| 1C,1D,1E,1F L1 | 1C,1D,1E,1F L2 | 1C,1D,1E,1F L3 | 1C,1D,1E,1F L0 |
| 18,19,1A,1B L2 | 18,19,1A,1B L3 | 18,19,1A,1B L0 | 18,19,1A,1B L1 |
| 14,15,16,17 L3 | 14,15,16,17 L0 | 14,15,16,17 L1 | 14,15,16,17 L2 |
| 10,11,12,13 L0 | 10,11,12,13 L1 | 10,11,12,13 L2 | 10,11,12,13 L3 |
| C,D,E,F L1 | C,D,E,F L2 | C,D,E,F L3 | C,D,E,F L0 |
| 8,9,A,B L2 | 8,9,A,B L3 | 8,9,A,B L0 | 8,9,A,B L1 |
| 4,5,6,7 L3 | 4,5,6,7 L0 | 4,5,6,7 L1 | 4,5,6,7 L2 |
| 0,1,2,3 L0 | 0,1,2,3 L1 | 0,1,2,3 L2 | 0,1,2,3 L3 |
| (X4) SRAM1 | (X4) SRAM2 | (X4) SRAM3 | (X4) SRAM4 |

*FIG. 8*

| 0LFF | 1LFF | 2LFF | 3LFF |  |  | 7DLFF | 7ELFF | 7FLFF |
|------|------|------|------|--|--|-------|-------|-------|
| 0LFE | 1LFE | 2LFE | 3LFE |  |  | 7DLFE | 7ELFE | 7FLFE |
| 0LFD | 1LFD | 2LFD | 3LFD |  |  | 7DLFD | 7ELFD | 7FLFD |
|  |  |  |  |  |  |  |  |  |
| 0L2 | 1L2 | 2L2 | 3L2 |  |  | 7DL2 | 7EL2 | 7FL2 |
| 0L1 | 1L1 | 2L1 | 3L1 |  |  | 7DL1 | 7EL1 | 7FL1 |
| 0L0 | 1L0 | 2L0 | 3L0 |  |  | 7DL0 | 7EL0 | 7FL0 |

*FIG. 10*

N-BIT WIDE PARALLEL ROTATION ALGORITHM

BACKGROUND OF THE INVENTION

This invention is in the field of digital image data handling, and more specifically is a method of rotating an image by any whole number multiple of ninety degrees.

It is frequently necessary to rotate an image by 90 or 270 degrees, or to form the mirror image of these. The obvious way to do this is to write an image into a memory in one direction and read it out in the orthogonal direction. For example, sixteen words, each of sixteen bits, could be written into a memory, and then sixteen words could be read out, the first output word containing the first bit of each input word, the second output word containing the second bit of each input word, etc. This is a time consuming process when done in software.

Some inventions handle this requirement by the provision of a specially designed memory into which image data words can be written in one direction and read out in an orthogonal direction. However, such special purpose memories are expensive, and tend to have a small capacity.

A method and circuit for producing these rotations at high speed without the necessity of special memory hardware is described in commonly owned patent applications Ser. No. 07/453,738 entitled "Method To Rotate A Bitmap image 90 Degrees", and Ser. No. 07/721,797, "Parallel Rotation Algorithm", which are incorporated by reference herein. In its simplest form, this prior invention can be described with reference to a 4 by 4 bit block of binary pixels in memory arranged as four horizontal words of four bits each, which must be rotated 90 degrees.

This prior method can be explained as the rotation of the bits within each 4 by 4 bit block and the rotation of the blocks of the whole image. First, the first word is loaded into the first line of a 4 by 4 bit buffer. The next word is circularly rotated one bit and loaded into the second line of the buffer. The third word is circularly shifted two bits and loaded into the third line of the buffer and the fourth line is circularly shifted three bits and loaded into the fourth line of the buffer. At this point a horizontal line in the original image is still a horizontal line in the buffer, but a vertical line in the original is now a diagonal line in the buffer.

Since the buffer is implemented from "by 1" devices, any bit in each device is addressable independently of the other devices, and a bit in one word in the buffer can be loaded into any of the four words of memory. Therefore if the bits in the buffer are addressed along diagonal lines parallel to the diagonal line in the buffer and loaded into single words of the memory, the diagonal line in the buffer will become a horizontal line at the output. Thus, the original vertical line is now horizontal. Continuing with addressing the bits along diagonal lines, a horizontal line in the buffer will become a diagonal line at the output. The output four words, prior to storage in memory, are shifted to line up the diagonal bits into a vertical line. Since this line started as a horizontal line, it can be seen that the 4 by 4 bit block has now been completely rotated 90 degrees. To rotate the blocks within the image, a simple addressing algorithm provides that the blocks read out of the block buffer are read into the correct area of a page buffer.

The above-described method relies on the idea that any one, but only one, bit from each of 4 memory devices can be accessed at one time. Therefore, if four vertical bits in a line are stored in one device, those four bits can never be output all at the same time, and a rotation that requires those bits to be formed into a horizontal line is impossible. However, if the vertical line is converted into a diagonal line (and the horizontal line is left horizontal) then each bit of each line resides in a different device, and the diagonal line, which originally was vertical, can be read out as a horizontal line.

The above-described method relies on a memory implemented from "by 1" devices, since, as described above, each bit in each device must be independently addressable. However, modern memory devices also include "by 4" devices, which means that every access outputs four bits in parallel, none of which are individually addressable: All four bits must come from the same address. What is required is a method that will perform this rotation in a memory implemented from such "by 4" devices.

SUMMARY OF THE INVENTION

The process starts with the reception of an image arriving on a data bus. An example would be an image that is 256 scanlines by 256 bits coming in, one 16 bit word at a time, on a 16 bit data bus. The scanlines are numbered 0, 1, 2, 3, etc. As each word is received, it is shifted in one direction by 4 bits times the scanline number mod 4, and stored into a page buffer. When the page buffer is fully loaded, the original bottom horizontal edge of the image will still be horizontal in the page buffer, but all vertical lines of the image will now be groups of diagonal lines in the page buffer, one pixel of each vertical line in each horizontal group of 4 bits.

Next, the bits are read out four 4-bit groups at a time, reordered, shifted again by whole number multiples of 4 bits, and loaded into a 4 scanline band buffer. The original vertical lines are still diagonal at this point but are now arranged so that 4 pixels from each original vertical line are in each horizontal group of 4 bits.

Now, the bits can be read out four 4-bit groups at a time to convert the diagonal lines to horizontal lines. At this point the original vertical lines are horizontal, and the original horizontal lines are diagonal. The final step is to do final shifts by whole number multiples of 4 bits to bring the diagonal lines to vertical, and the image is completely rotated. This process will now be discussed in more detail with reference to the following drawings.

BRIEF DESCRIPTION OF THE DRAWINGS

FIG. 1 is a diagram of the original simple image.

FIG. 2 is the simple image after the first shift.

FIG. 8 is a larger image as it would be arranged in the band buffer.

FIG. 10 is a diagram of the format of a typical original image.

DETAILED DESCRIPTION OF THE INVENTION

Figures 1, 2:
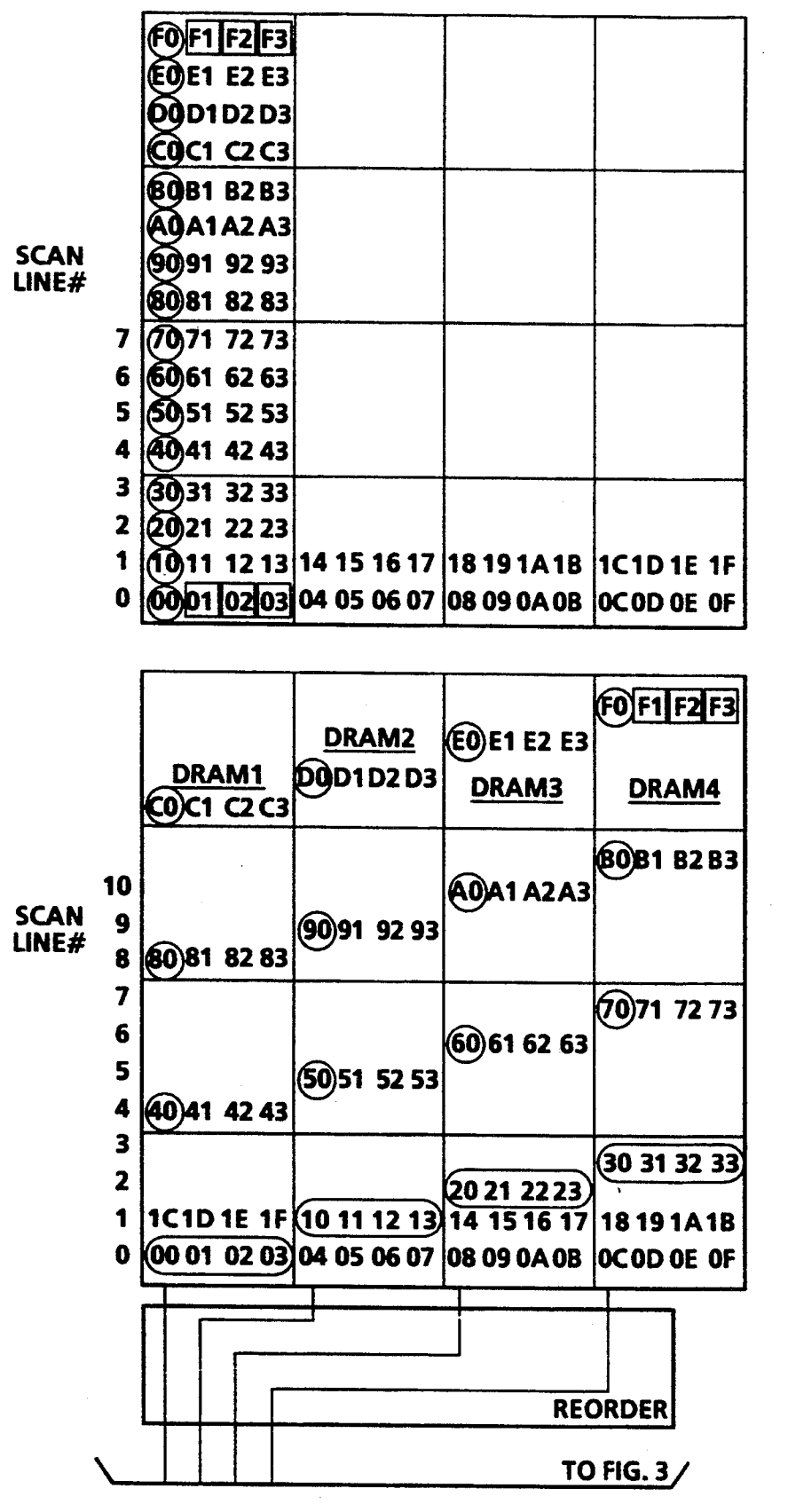
Figures 3, 4, 5, 6:
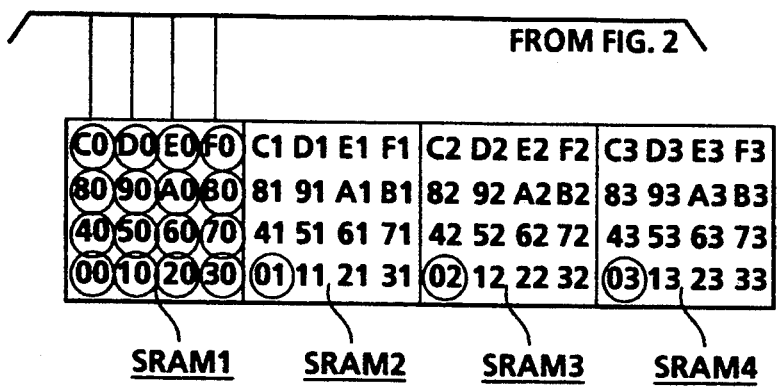
FIG. 3 is the simple image data after reordering.
FIG. 4 is the simple image data in the band buffer after the second shift
FIG. 5 is is the simple image data after it is addressed and output from the band buffer.
FIG. 6 is the fully rotated simple image after the third shift.

The original image is shown in FIG. 1. In this simple example, the image is 16×16 bits, and only some of the bits are labelled. For example, at the top of the image, the labelled bits are line F (in hexadecimal notation) bits 0 to 3, which is written as F$L$0, 1, 2, 3 and in the bottom line the labelled bits are line 0, bits 0 to F, written as 0$L$0-F. The source of these scanlines is not important, they may be coming from a raster input scanner, a memory, etc. The pixels at the left edge of the image are enclosed in circles and the top and bottom lines are enclosed in squares to aid in visualizing the data flow.

The object of the first operation is to convert the vertical lines of the original image into diagonal lines. This is done by first loading each scanline received into a shifter and shifting each scanline to the right by a number of bits equal to 4 times the scanline number mod 4. Thus, scanline 0 is shifted 0 bits, scanline 1 is shifted 4 bits, scanline 2 is shifted 8 bits, scanline 3 is shifted 12 bits and scanline 4 is shifted 0 bits again. The result is stored into a page buffer implemented from four RAMs, each 4 bits wide, as shown in FIG. 2.

The next step is to read out from the page buffer along the indicated diagonal. For example, the first 16 bit output word is 00, 01, 02, 03, 10, i 1, 12, 13, 20, 21, 22, 23, 30, 31, 32, 33. This is reordered by a network of connecting lines that lead to the next shifter. For clarity, only the first four of 16 connecting lines is shown. The result is the shifter being loaded by the pattern shown in FIG. 3. The shifter then shifts to the right by 4 bits times the word number mod 4, and stores the result in the band buffer, resulting in the pattern shown in FIG. 4.

From this second pattern diagonals are again read out and loaded into a shifter as shown in FIG. 5. For example, the first 16 bit word read out is 00, 10, 20, 30, 40, 50, 60, 70, 80, 90, A0, B0, C0, D0, E0, F0. In the shifter the top word is shifted to the left 0 bits, the second word is shifted 4 bits, the third word is shifted 8 bits and the bottom word is shifted 12 bits. The result as shown in FIG. 6 is output as words of the fully rotated image.

The example described above is of the rotation of an image that is 16 by 16 bits. However, this method can be scaled up to operate on images of any size. An example of an image that is 128 scanlines by 256 bits follows. The original image is shown in FIG. 10.

Figure 7:
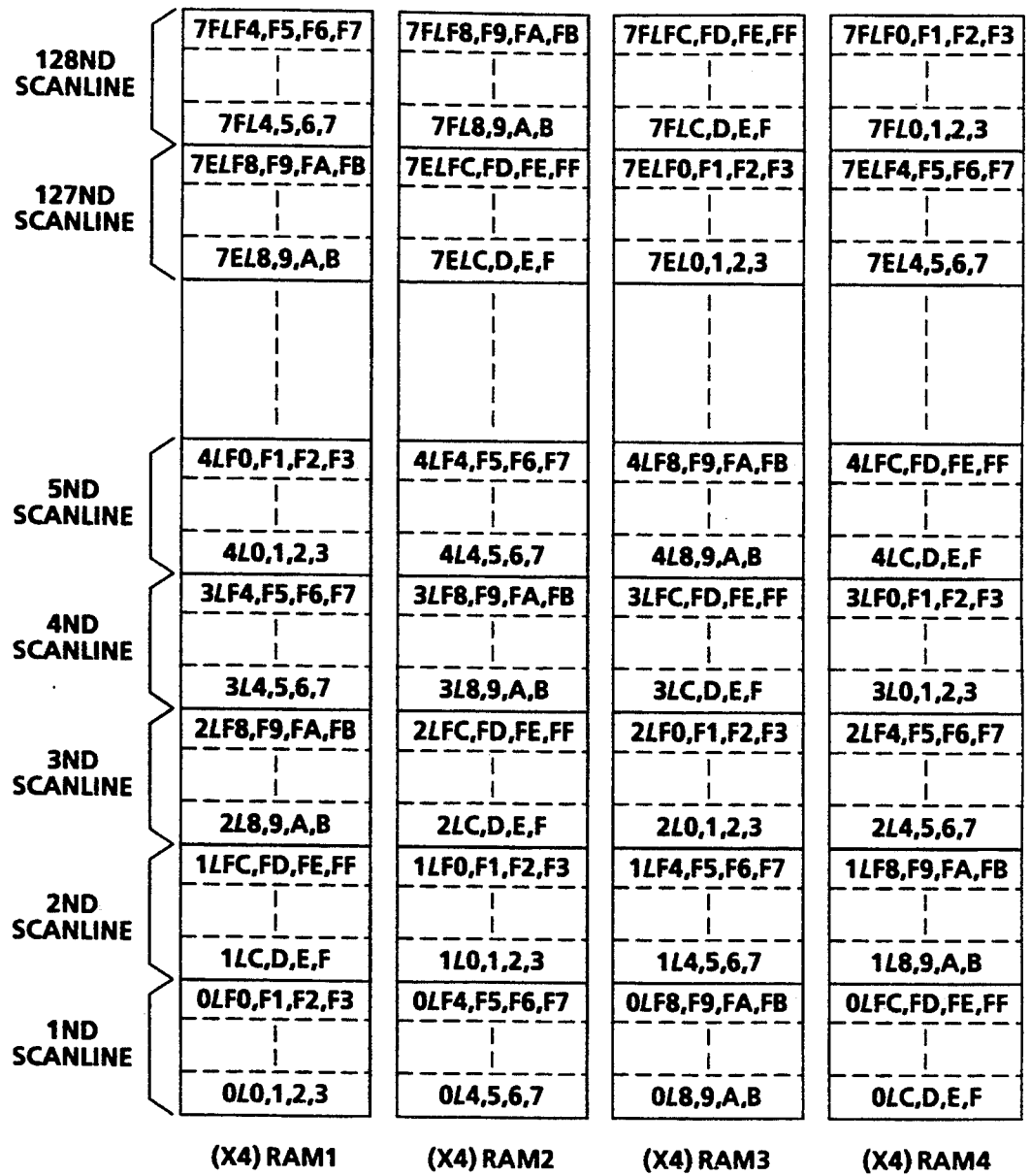
FIG. 7 is a larger image as it would be stored in the page buffer.

First, the scanlines must be stored into the page buffer as shown in FIG. 7. Each of the sixteen 16-bit words of scanline 0, 0$L$0-F through 0$L$FF, are circularly shifted 0 bits and loaded into the first 16 addresses as shown. The words of each successive scanline up through scanline 7F (hexadecimal for scanline 127) are each circularly shifted 4 bits times the scanline number mod 4, and stored, as shown. The result is a fully loaded page buffer, the equivalent of FIG. 2.

Next, the image data bits have to be read out of the page buffer, implemented from RAMs 1, 2, 3 and 4, reordered, shifted and loaded into the four scanline band buffer implemented from the four 4-bit wide RAMs 1', 2', 3' and 4'. For example, the first 16 bits of data read from the page buffer RAMs are:

0$L$0, 1, 2, 3 from RAM 1
0$L$0, 1, 2, 3 from RAM 2
1$L$0, 1, 2, 3 from RAM 3
2$L$0, 1, 2, 3 from RAM 4.

These bits will be reordered, shifted 0 bits and stored in the band buffer as follows:

0, 1, 2, 3$L$0 to RAM 1'
0, 1, 2, 3$L$1 to RAM 2'
0, 1, 2, 3$L$2 to RAM 3'
0, 1, 2, 3$L$3 to RAM 4'

The second 16 bits of data read from the page buffer RAMs are:

4$L$0, 1, 2, 3 from RAM 1
5$L$0, 1, 2, 3 from RAM 2
6$L$0, 1, 2, 3 from RAM 3
7$L$0, 1, 2, 3 from RAM 4

These bits will be reordered, shifted 4 bits and stored in the band buffer as follows:

4, 5, 6, 7$L$3 to RAM 1'
4, 5, 6, 7$L$0 to RAM 2'
4, 5, 6, 7$L$1 to RAM 3'
4, 5, 6, 7$L$2 to RAM 4'

The resultant arrangement of data in the band buffer is shown in FIG. 8.

From the band buffer the data will be read out with the proper addressing. For example, the first 16 bit word to be read out is:

0, 1, 2, 3$L$0 from RAM 1'
4, 5, 6, 7$L$0 from RAM 2'
8, 9, A, B$L$0 from RAM 3'
C, D, E, F$L$0 from RAM 4'

The second word to be read out is:

10, 11, 12, 13$L$0 from RAM 1'
14, 15, 16, 17$L$0 from RAM 2'
18, 19, 1A, 1B$L$0 from RAM 3'
1C, 1D, 1E, 1F$L$0 from RAM 4'

These words are then circularly shifted by the appropriate amounts (zero bits for this first scanline) to produce the final output image.

Figure 9:
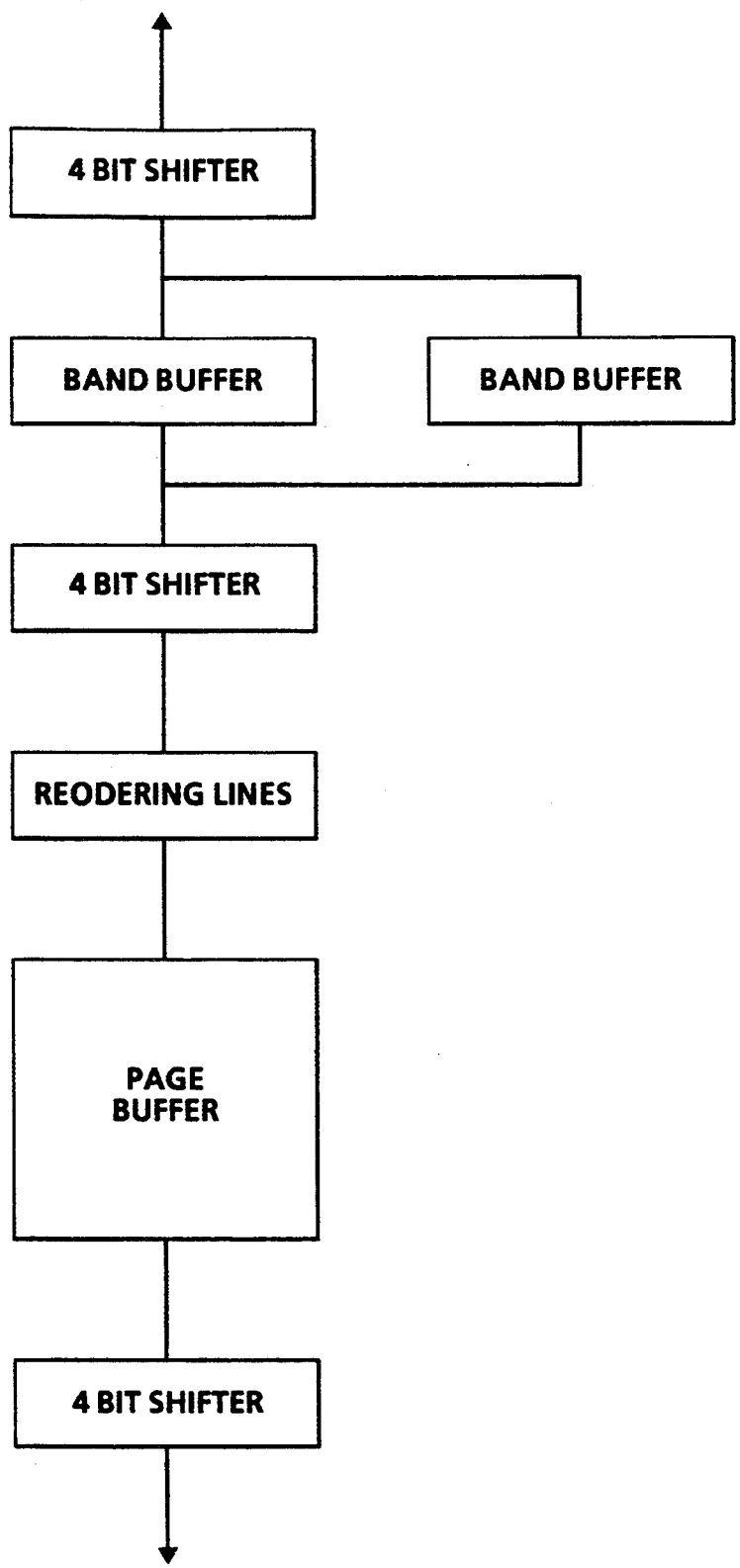
FIG. 9 is an overall diagram of the circuit.

FIG. 9 shows the actual pieces of hardware required for this operation. When arranged in pipeline form, as shown, the minimum number of circuit elements required are three shifters, one band buffer and one page buffer. To speed up the throughput, two band buffers can be used concurrently, one being loaded while the other is outputting data to the next element.

This circuit can be used in a number of ways. For example, to rotate an image, it is the designer's choice whether the data flow is upward, into the page buffer first, or downward, into the band buffer first. To get rotations of 90 and 270 degrees, and their mirror images, shifts can be right or left so that diagonals can be formed that proceed upward in either the right or left directions and the store and read cycles can proceed from the bottom or the top of the buffers.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

We claim:

1. A circuit for rotating an x scanline by y bit image grouped into m-bit words comprising:

a first shifter for circularly shifting each word by n bits times the scanline number mod n, where n is a fraction of m, a first buffer means implemented from m/n memory devices, numbered 1 to m/n, each device n-bits wide, for storing the words shifted by said first shifter, a system of connecting lines for reordering the output bits of said first buffer means so that when the bits are read out of the first buffer in the following order:

$0L0, 1, \ldots n\text{-}1$ from memory device 1; $1L0, 1, \ldots n\text{-}1$ from memory device 2; ... to memory device m/n .
.
to line $x - 1$ they will be reordered into the following order:

$0, 1, \ldots n - 1L0; 0, 1, \ldots n - 1L1; \ldots$

.
.
to line $x - 1$ a second shifter for grouping said bits received from said connecting lines into m bit words, numbering said m bit words from zero, and circularly shifting each m bit word received from said connecting lines by n bits times the m bit word number, mod n, a second buffer means implemented from m/n memory devices, each device n-bits wide, for storing the output of said second shifter, and a third shifter for receiving and circularly shifting each word received from said second buffer means by n bits times the third shifter scanline number mod n, the result being the fully rotated image.

2. A circuit for rotating an x scanline by y bit image grouped into m bit words comprising:

a first shifter for circularly shifting each word by n bits times the scanline number, mod n, where n is a fraction of m, a first buffer means implemented from m/n memory devices, numbered 1 to m/n, each device n-bits wide, for storing the result of said shifting of said first shifter, a second shifter for receiving said shifted words from said first buffer, numbering said shifted words from zero to generate numbered m circularly shifting each numbered m bit word received from said first buffer means by n bits times the m bit word number, mod n a system of connecting lines for reordering the output bits of said second shifter so that when the bits are read out of the second shifter in the following order:

$0, 1, \ldots n\text{-}1L0$ from memory device 1; $0, 1, \ldots n\text{-}1 \ 1$ from the memory device 2; ... to memory device m/n .
.
to line $x - 1$ they will be reordered into the following order:

$0L0, 1, \ldots n - 1; 1L0, 1, \ldots n - 1; \ldots$

.
.
to line $x - 1$ a second buffer means implemented from m/n memory devices, each device n-bits wide, for storing the output of said connecting lines, and a third shifter for reading out the image data from said second buffer means and for circularly shifting each word received from said second buffer means by n bits times the third shifter scanline number, mod n, the result being the fully rotated image.

* * * * *